United States Patent [19]

Martin

[11] 4,199,153
[45] Apr. 22, 1980

[54] SEALING ASSEMBLY FOR BLENDING APPARATUS

[75] Inventor: George J. Martin, Waukegan, Ill.
[73] Assignee: Abbott Laboratories, North Chicago, Ill.
[21] Appl. No.: 5,105
[22] Filed: Jan. 22, 1979
[51] Int. Cl.² .............................................. F16J 15/18
[52] U.S. Cl. .......................................... 277/4; 277/71; 277/66; 277/105; 277/123; 366/139; 366/220
[58] Field of Search .................. 277/4, 59, 66, 71, 79, 277/104, 105, 123–125; 366/139, 220, 235

[56] References Cited

U.S. PATENT DOCUMENTS

| | | | |
|---|---|---|---|
| 2,486,939 | 11/1949 | Freund | 277/105 X |
| 3,003,797 | 10/1961 | Gage | 277/124 X |
| 3,129,960 | 4/1964 | Schrodt | 277/71 X |
| 3,313,550 | 4/1967 | Culman | 277/4 |
| 3,472,522 | 10/1969 | Winfrey | 277/105 X |
| 3,521,863 | 7/1970 | Graham | 366/139 |
| 3,652,098 | 3/1972 | Kawazu et al. | 277/105 X |
| 3,834,715 | 9/1974 | Butler | 277/59 X |

FOREIGN PATENT DOCUMENTS

| | | | |
|---|---|---|---|
| 50158 | 10/1939 | France | 366/220 |
| 445508 | 4/1936 | United Kingdom | 366/139 |

*Primary Examiner*—Robert S. Ward, Jr.
*Attorney, Agent, or Firm*—Robert L. Niblack; Neil E. Hamilton

[57] ABSTRACT

A sealing assembly for a vacuum connection to a mixing apparatus so that the contents of the mixing apparatus are held under a vacuum during blending and the introduction of particulate matter is substantially reduced. The sealing assembly for the vacuum conduit is provided by means of a separate housing. A vacuum conduit is integrally attached to and rotates with the blender and an end portion of the conduit is sealed by means of bushings and packing in the assembly housing. The sealing assembly can be easily disconnected for maintenance purposes.

11 Claims, 2 Drawing Figures

4,199,153

SEALING ASSEMBLY FOR BLENDING APPARATUS

BACKGROUND OF THE INVENTION

This invention relates to a sealing assembly for a blending apparatus. More particularly, it relates to a sealing arrangement for a vacuum source connected to a blender wherein the blender is rotated and the vacuum source can be connected in a manner such that the risk of contaminants from outside atmosphere or the sealing assembly itself is substantially reduced.

There exists a problem in making connections to a blending apparatus wherein the contents of the blender are held under a vacuum during the mixing operation. In a conventional blender of this type, a vacuum line is usually placed inside a trunion and ultimately interconnected with the inside of the blender. Some means of sealing the inner vacuum line from outside atmosphere must be accomplished as the trunion rotates over the inner vacuum line. In U.S. Pat. No. 3,313,550, a stuffing box is provided for a mixing apparatus and is in the form of a split seal arrangement to be placed around an agitator shaft. The prior art does not provide a solution to the problem of providing a sealing arrangement for a blending apparatus wherein the contents are placed under a vacuum and a sealing assembly is arranged such that the probability of contaminants entering into the blender are reduced to a minimum.

It is an advantage of the present invention to provide a novel sealing assembly for a blending apparatus. Other advantages are a seal arrangement for a blending apparatus wherein a vacuum connection is made and the sealing assembly is provided separately from the blender; a vacuum line is integrally connected to the blending device and is sealed inside of the separate housing through which the vacuum connection to the vacuum source is made; a sealing assembly for a rotating blending apparatus wherein the sealing means for a vacuum connection is made in such a manner that it can be easily disconnected for maintenance purposes; a sealing assembly for a blender with a vacuum connection wherein the sealing assembly can be mounted to a standard blending apparatus with a vacuum connection.

SUMMARY OF THE INVENTION

The foregoing objects are accomplished and the shortcomings of the prior art overcome by the present sealing assembly for a blending apparatus wherein a vacuum conduit is in fluid communication with the inside of the mixer. The blender will have the usual end wall with means to rotatably support the blender which will include a trunion. Passage means extend through the trunion and are in fluid communication with the inside of the blender. The passage means includes an extending conduit member integrally secured to the blender and rotatable therewith. A sealing housing member is separately supported from the blender and is adapted to receive an end portion of the conduit member. A vacuum conduit is also in fluid-tight communication with the inside of the housing and means are provided to seal the conduit member inside the housing member. The sealing housing member includes a main body portion with at least one opposing end plate removably secured to it. The preferred means of sealing the tubular member inside the housing member includes spaced apart bushing members with sealing rings disposed therebetween. Grease fitments are also provided for purposes of lubricating the bushings.

BRIEF DESCRIPTION OF THE DRAWING

A better understanding of the sealing assembly will be afforded by reference to the drawing wherein.

DESCRIPTION OF THE PREFERRED EMBODIMENT

Figure 1:
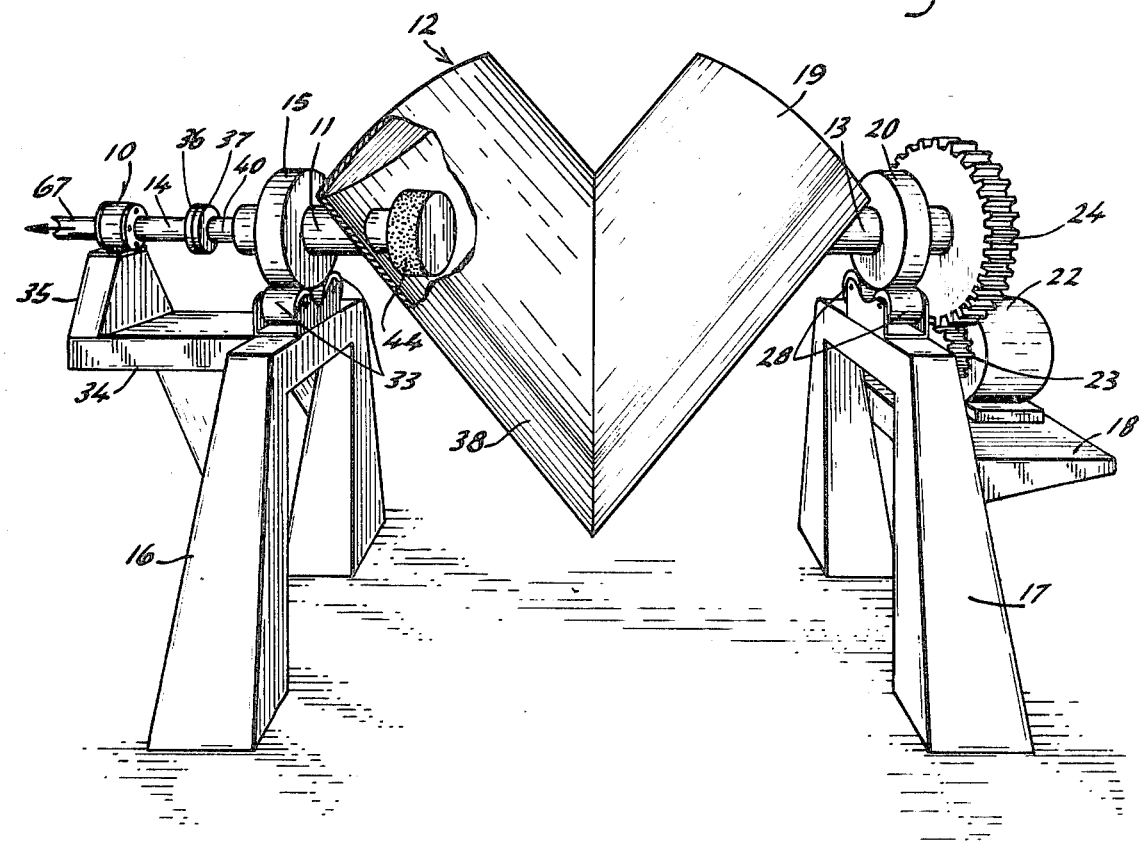
FIG. 1 is a perspective view illustrating a blending apparatus with means for supporting and driving the blender and the novel vacuum sealing assembly therefor.
Figure 2:
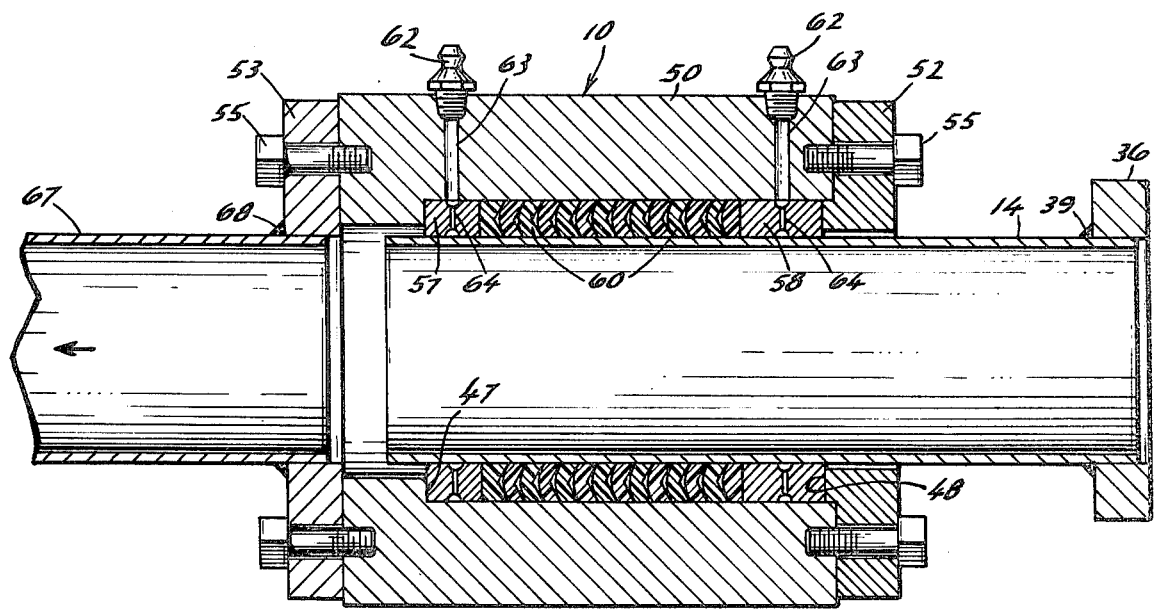
FIG. 2 is an enlarged view in vertical section illustrating the sealing assembly for the blender shown in FIG. 1.

The sealing assembly generally 10 is shown in FIGS. 1 and 2 in combination with a blending apparatus 12 which is rotatably supported on supports 16 and 17 by means of trunions 11 and 13 to which are secured guide rollers 15 and 20 rotatably supported on support rollers 33 and 28. Secured to the end of trunion 13 is a bull gear 24 which is driven by drive gear 23 of motor 22. A support platform 18 provides the necessary placement of motor 22. Extending through trunion 11 and in communication with the inside of mixer 12 is a pipe member 40 which terminates in a filter 44. Pipe 40 is attached to a conduit member 14 by engagement of a flange 37 secured to flange 36 connected to pipe 40. The sealing assembly 10 is mounted on a vertical support 35 which in turn extends from support platform 34 attached to support 16. A vacuum pipe 67 is also interconnected to sealing assembly 10 opposite conduit member 14.

Referring to FIG. 2, it will be seen that the sealing assembly includes a cylindrical housing 50 to which are attached end plates 52 and 53 secured through cap screws 55. Conduit member 14 will be integrally connected to flange 36 by means of weldment 39. The opposite end of conduit member 14 will be sealed and positioned in housing 50 through oppositely placed bushings 57 and 58 having grease grooves 64 communicating with grease passage 63 in housing 50. Grease fittings 62 of the Zerk type are placed in communication with the grease passages 63. Disposed between bushings 57 and 58 are packing rings 60 which generally are of the inner fitting V-shaped configuration except for those portions of the packing rings which contact bushings 57 and 58 which are straight edged. It will be noted that bushings 57 and 58 with the packing rings 60 placed therebetween are suitably held in housing 50 by abutment against end wall 47 of housing 50 and end wall 48 of end plate 52. Conduit member 14 will have its end portion terminate a short distance from the end of end plate 53. Secured to end plate 53 in a fixed manner is vacuum pipe 67 which is fixed thereto through weldment 68 and is spaced from conduit member 14.

OPERATION

A better understanding of the advantages of sealing assembly 10 will be had by a description of its assembly and operation. Blender 12 is of a standard variety known in the trade as a twin shell blender/dryer and is manufactured by the PattersonKelly Company of East Stroudsburg, Pennsylvania. In this instance it has a capacity of forty cubic feet. The drive and support mechanisms are indicated merely for illustration purposes as these could take the form of a variety of mechanisms. The essential component and typical vacuum connection to inside the blender 12 is pipe member 40 which is integrally connected and fixed to trunion 11 and communicating with the inside of the blender 12. This connection can be made to the standard blender by merely supplying flanges 36 and 37. Conduit member 14 will be placed inside cylindrical housing 50 with bushing 57, packing rings 60 and bushing 58 placed therein and over tubular member 14 in the indicated manner. End plate 52 will then be attached to housing 50 by cap screws 55 to secure the bushings and packing therein. At the opposite end, vacuum pipe 67 will be attached to cylindrical housing 50 by the securing of cap screws 55.

A vacuum source of 28–29 inches of mercury will be connected to vacuum pipe 67 and will be used for drying purposes. Blender 12 will be rotated through the driving engagement of drive gear 23 and bull gear 24. It should be appreciated that conduit member 14 will also rotate with blender 12 as it is directly fixed to pipe member 40 which in turn is secured to blender 12 for rotation therewith. By having the conduit tubular member 14 sealed in a separate housing 50 it can be appreciated that any contamination from the outside atmosphere and into the blender is extremely remote as none of the packing rings 60 or the bushings 57 and 58 are exposed to the outside atmosphere. Instead, they are housed inside housing 50 and sealed at opposing ends through end plates 52 and 53. Although the sealing assembly 10 provides a separate sealing assembly for a rotating tubular conduit which is in fluid communication with the inside of a blender and a vacuum source, it is easily disassembled for maintenance purposes by merely removing one or two end plates.

The preferred material for fabricating housing 50 is stainless steel and the dimensions are 4½ inches for the outside diameter and the length. The bore for the packing bushings 57 and 58 is 2⅞ inches for the internal diameter and 3⅜ inches in depth. The end plates 52 and 53 have an outside diameter of 4½ inches and are ½ inch in width.

In the previous description of the sealing assembly 10 it should be appreciated that the illustration of a blending apparatus of a particular type is intended for illustration purposes only. Any type of a rotatable blending-mixing unit would be operable with sealing assembly 10. It could include an intensifier mixer bar and the housing can be of various geometric configurations. A heating jacket can also be utilized in conjunction with the blender to aid in drying the contents. While a vacuum conduit is connected with the blender any fluid connection would be operable and the same advantages obtained. Further, while a particular bushing and sealing ring arrangement has been described for use in the sealing arrangement, any type of bushings whether of the lubricated or self-lubricating type and any number of sealing rings could be utilized and still accomplish the advantages of this invention.

It will thus be seen that through the present invention there is now provided a novel sealing arrangement for a rotatable blender having a fluid connection which will substantially reduce any problems of contaminants coming in contact with the inside of the blender. The sealing arrangement is placed separately from the blender and permits a vacuum connecting tube to rotate inside the sealing arrangement so as not to expose any of the packing or bushing members to outside atmosphere. At the same time, the sealing arrangement is easily disassembled for maintenance purposes and can be easily lubricated for low maintenance problems.

The foregoing invention can now be practiced by those skilled in the art. Such skilled persons will know that the invention is not necesarily restricted to the particular embodiments presented therein. The scope of the invention is to be defined by the terms of the following claims as given meaning by the preceding description.

I claim:

1. A sealing assembly for a blending apparatus wherein a fluid conduit is in fluid communication with the inside of said mixer comprising:
   a blender housing defining an end wall;
   means to rotatably support said blender including a trunion;
   passage means extending through said trunion and in fluid communication with the inside of said mixer;
   said passage means including an extending conduit member integrally secured to said blender and rotatable therewith;
   a sealed housing member separately supported from said blender and adapted to receive an end portion of conduit member;
   means to seal an open end of said conduit member inside said housing member; and
   a fluid conduit in separate fluid-tight communication with the inside of said housing.

2. The sealing assembly as defined in claim 1 wherein said fluid conduit is a vacuum conduit.

3. The sealing assembly as defined in claim 1 wherein said sealed housing member includes a main body portion with at least one opposing end plate removably secured to said body portion.

4. The sealing assembly as defined in claim 2 wherein said passage means further includes a pipe member and said conduit member is secured to said pipe member.

5. The sealing assembly as defined in claim 4 wherein said means to seal said conduit member inside said housing comprises two spaced bushing members with packing members positioned therebetween.

6. The sealing assembly as defined in claim 5 wherein said packing members are of the interfitting V-ring type.

7. The sealing assembly as defined in claim 5 wherein the said open end of said conduit member is spaced adjacent said vacuum conduit and one of said bushing members is positioned in said body portion adjacent said open end and opposite said vacuum conduit.

8. The sealing assembly as defined in claim 7 wherein said bushing members include grease grooves and further including grease fittings in communication with said grooves and supported by said body portion.

9. The sealing assembly as defined in claim 3 wherein said end plates are removably secured to said body portion by means of cap screws.

10. The sealing assembly as defined in claim 9 including two opposing end plates removably secured by means of said cap screws.

11. The sealing assembly as defined in claim 10 wherein said blender is of a V-shaped configuration.

* * * * *